(12) United States Patent
Tanimura et al.

(10) Patent No.: US 8,989,572 B2
(45) Date of Patent: Mar. 24, 2015

(54) OPTICAL PATH ESTABLISHING METHOD AND OPTICAL NODE APPARATUS

(71) Applicant: Fujitsu Limited, Kawasaki-shi, Kanagawa (JP)

(72) Inventors: Takahito Tanimura, Berlin (DE); Takeshi Hoshida, Kawasaki (JP); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 13/727,902

(22) Filed: Dec. 27, 2012

(65) Prior Publication Data

US 2013/0209093 A1    Aug. 15, 2013

(30) Foreign Application Priority Data

Feb. 10, 2012  (JP) .................. 2012-027808

(51) Int. Cl.
| | | |
|---|---|---|
| H04B 10/08 | (2006.01) | |
| H04B 10/077 | (2013.01) | |
| H04J 14/02 | (2006.01) | |
| H04J 14/06 | (2006.01) | |

(52) U.S. Cl.
CPC ........ H04B 10/0775 (2013.01); H04J 14/0267 (2013.01); H04J 14/0276 (2013.01); H04J 14/0258 (2013.01); H04J 14/0271 (2013.01); H04J 14/0275 (2013.01); H04J 14/06 (2013.01)
USPC .................. 398/32; 398/30; 398/33

(58) Field of Classification Search
CPC ............ H04B 10/0775; H04B 10/07957; H04B 10/548
USPC ....................................... 398/30–34
See application file for complete search history.

(56) References Cited

U.S. PATENT DOCUMENTS

| | | | |
|---|---|---|---|
| 7,580,632 | B1 | 8/2009 | Feuer et al. |
| 2002/0048062 | A1 | 4/2002 | Sakamoto et al. |
| 2002/0063934 | A1 | 5/2002 | Sakauchi |
| 2003/0025957 | A1* | 2/2003 | Jayakumar .................... 359/110 |
| 2009/0214221 | A1* | 8/2009 | Li et al. ......................... 398/136 |
| 2009/0238563 | A1* | 9/2009 | Fukashiro et al. .............. 398/30 |
| 2011/0293270 | A1* | 12/2011 | Takeuchi et al. ................. 398/45 |
| 2012/0141130 | A1* | 6/2012 | Nakashima et al. ............. 398/82 |

FOREIGN PATENT DOCUMENTS

| | | |
|---|---|---|
| JP | 8-298486 | 11/1996 |
| JP | 2002-57624 | 2/2002 |
| JP | 2002-164846 | 6/2002 |
| JP | 2005-223944 | 8/2005 |

OTHER PUBLICATIONS

Takahito Tanimura et al., "In-band FSK Supervisory Signaling between Adaptive Optical Transceivers Employing Digital Signal Processing", Optical Communication (ECOC), 2011 37th European Conference and Exhibition, pp. 1-3.

* cited by examiner

*Primary Examiner* — Dzung Tran
(74) *Attorney, Agent, or Firm* — Staas & Halsey LLP

(57) ABSTRACT

An optical node apparatus that establishes an optical path between a first optical node and a second optical node in an optical network include a frequency modulation unit that superimposes a supervisory signal on a main signal by frequency-modulating the main signal, and a frequency demodulation unit that frequency-demodulates the supervisory signal superimposed on the received main signal.

6 Claims, 12 Drawing Sheets

OPTICAL PATH ESTABLISHING METHOD AND OPTICAL NODE APPARATUS

CROSS-REFERENCE TO RELATED APPLICATION

This application is based upon and claims the benefit of priority of the prior Japanese Patent Application No. 2012-027808, filed on Feb. 10, 2012, the entire contents of which are incorporated herein by reference.

FIELD

The embodiments discussed herein are related to an optical path establishing method and an optical node apparatus.

BACKGROUND

FIG. 1 illustrates a configuration of an optical network of related art. As illustrated in FIG. 1, control nodes (CNT) 2a through 2f are arranged on a control plane respectively for optical nodes 1a through 1f, including optical cross-connect (OXC) on a data plane.

An optical path may be established from the optical node 1a to the optical node 1f. Each control node stores detailed physical information about a link between an optical node corresponding to a source control node and an adjacent optical node. The detailed physical information may include, for each of a plurality of modulation methods, SNR (signal to noise ratio) degradations, chromatic dispersion, polarization mode dispersion (PMD), and non-linear effects such as Kerr effect of optical fiber. The control node 2a corresponding to the optical node 1a corrects the detailed physical information of links of control nodes 2b through 2f with optical nodes 1b through 1f. The control node 2a reserves and establishes an optical path (1a, 1b, 1c, 1e, and 1f) connecting the optical node 1a down to the optical path 1f denoted by a heavy solid line with respect to each selectable modulation method in accordance with parameters. The parameters include baud rate, forward error correction (FEC) overhead rate, optical signal noise ratio (OSNR) tolerance, chromatic dispersion tolerance, PMD tolerance, and non-linear effect tolerance.

As a related technique, a transmitter intensity-modulates (amplitude-modulates) an optical data signal with a low-speed path ID tone signal and then transmits the modulated optical data signal to a receiver. The receiver demodulates the path ID tone signal, thereby determining a modulation method and baud rate to establish a path. Related techniques are also described in U.S. Pat. No. 7,580,632.

As a related technique, a bias of an electroabsorption type modulator (EA modulator) at a transmitter is controlled in accordance with error rate information detected by a receiver so that chirp of an optical modulation signal is controlled to an optimum point. Transmission of a control signal from the receiver to the transmitter may be performed by digital multiplexing the control signal on an optical main signal. Related techniques are also described in Japanese Laid-open Patent Publication No. 2002-164846.

As a related technique, a receiver measures transmission quality with a transmission characteristic measurement unit thereof, and transmission parameters are controlled to optimum values in response to measurement results. The transmission parameters include optical transmission power, optical wavelength, dispersion compensation amount, and pre-chirp. Related techniques are also described in Japanese Laid-open Patent Publication No. 2005-223944.

As a related technique, a receiver measures OSNR, and bit error rate (BER) of each wavelength of a wavelength-division multiplexed (WDM) signal, and transmits measurement results in overhead information of an optical signal to a transmitter. The transmitter optimum-controls a parameter, dispersion compensation amount, and pre-emphasis of an optical transmission signal. Related techniques are also described in Japanese Laid-open Patent Publication No. 2002-57624.

Japanese Laid-open Patent Publication No. 8-298486 discloses a superimposed transmission technique in which an optical main signal is low-intensity-modulated with a supervisory control signal.

A plurality of modulation methods are characterized by a variety of parameters including baud rate, FEC overhead rate, OSNR tolerance, chromatic dispersion tolerance, PMD tolerance, and non-linear effect tolerance. Optical path establishing methods of related art perform a number of steps before establishing an optical path optimum for highly efficient data transmission. Design for establishing the optimum optical path is difficult.

In the related technique where the optical data signal that is optical-intensity modulated with a low-rate signal is transmitted and the receiver demodulates the low-rate signal, cross-gain modulation caused through an optical amplifier and stimulated Raman scattering causes a path ID tone signal from another channel to enter. As a result, quality degradation takes place on a main signal.

SUMMARY

According to an aspect of the embodiments, an optical node apparatus that establishes an optical path between a first optical node and a second optical node in an optical network include a frequency modulation unit that superimposes a supervisory signal on a main signal by frequency-modulating the main signal, and a frequency demodulation unit that frequency-demodulates the supervisory signal superimposed on the received main signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments are described below with reference to the drawings.

Optical Path Establishing Method

Figure 1:
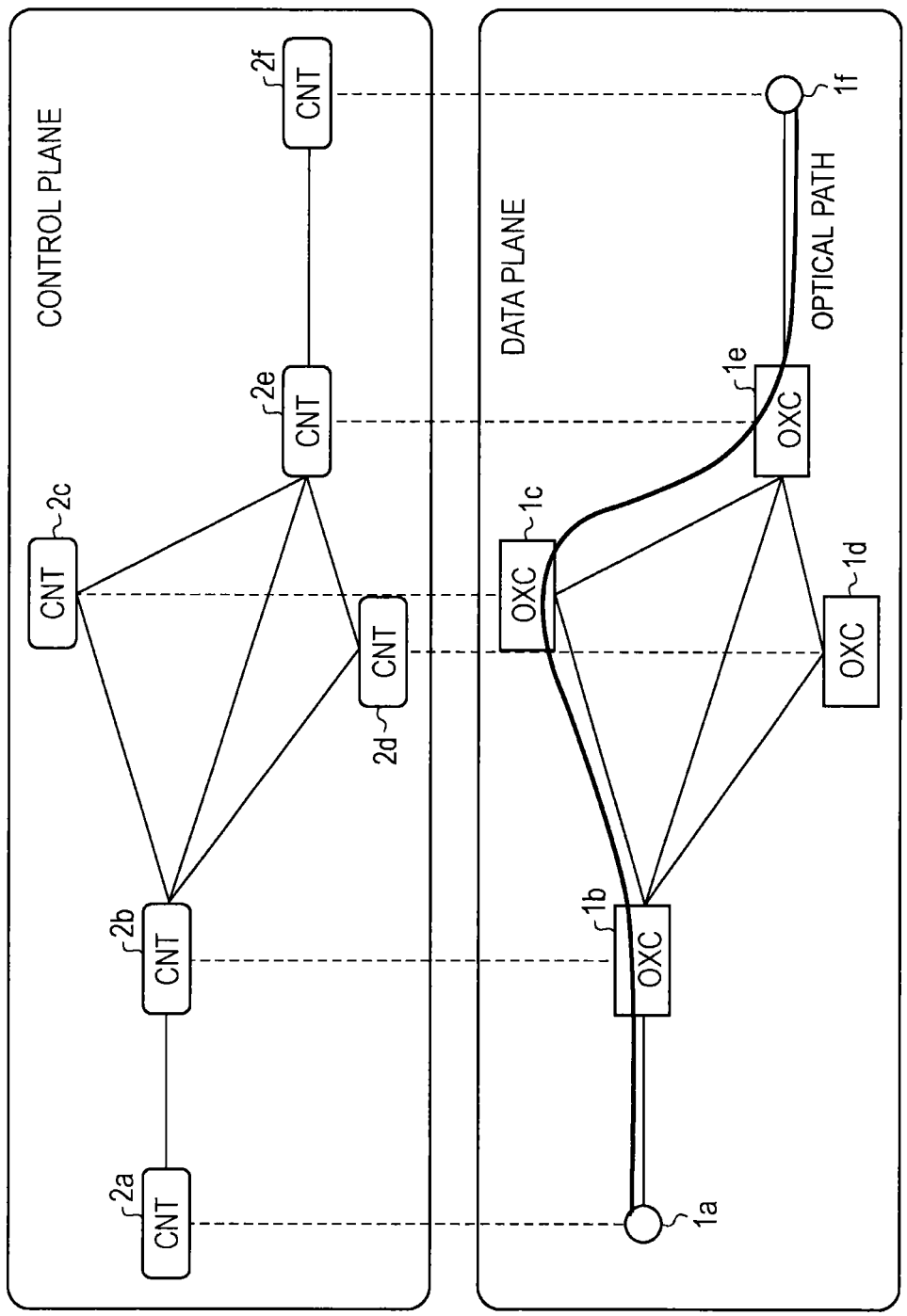
FIG. 1 is an example of an optical network of related art.
Figure 2:
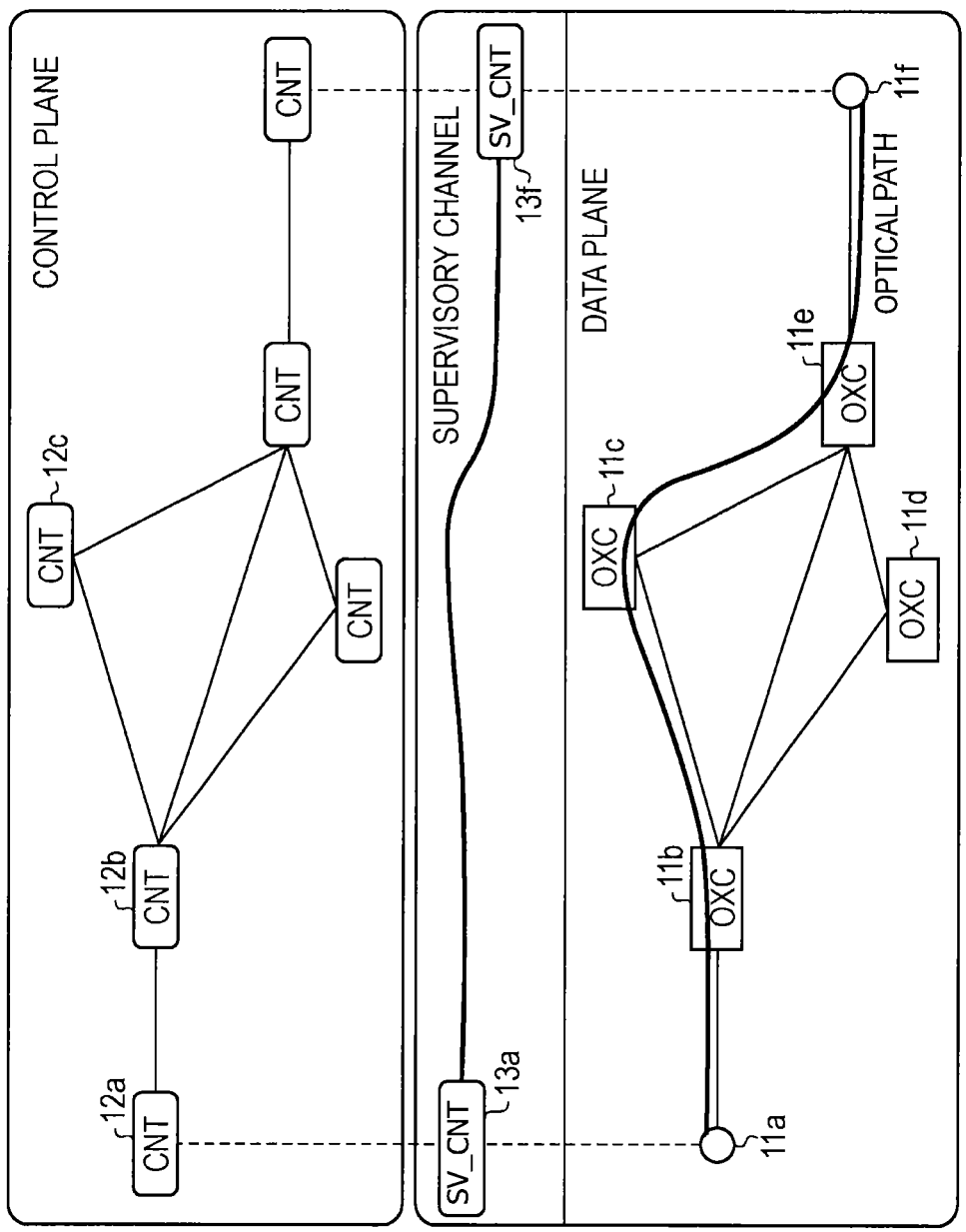
FIG. 2 illustrates a configuration of an optical network of an embodiment.

FIG. 2 illustrates a configuration of an optical network of an embodiment. As illustrated in FIG. 2, control nodes (CNT) 12a through 12f are arranged on a control plane respectively for optical nodes 11a through 11f including OXC's on a data plane. Each of the optical nodes 11a and 11f may use a plurality of modulation formats including quadrature phase shift keying (QPSK), quadrature amplitude modulation (QAM), and orthogonal frequency division multiplexing (OFDM), and thus selects as a modulation format of a main signal one of these methods. A main optical signal includes a client signal transmitted from a client.

An optical path may now be established from the optical node 11a all the way down to the optical node 11f. Each control node collects detailed physical information about a link between an optical node corresponding to a source control node and an adjacent optical node. The detailed physical information may include, for each of a plurality of modulation formats, SNR degradations, chromatic dispersion, polarization mode dispersion (PMD), and non-linear effects. The control node 12a corresponding to the optical node 11a mutually exchanges with the control nodes 12b through 12f the detailed physical information about links thereof respectively with the optical nodes 11b through 11f. The control node 12a reserves and establishes an optical path (11a, 11b, 11c, 11e, and 11f) denoted by a heavy solid line connecting the optical node 11a all the way to the optical node 11f in accordance with parameters of unused wavelength and OSNR of a selectable modulation format.

The optical node 11a and the optical node 11f include supervisory controllers (SV_CNT) 13a and 13f, respectively. The supervisory controllers 13a and 13f connect a supervisory channel through the optical path (11a, 11b, 11c, 11e, and 11f) established between the optical nodes 11a and 11f. The supervisory controllers 13a and 13f mutually exchange, through the supervisory channel, supervisory signal data such as OSNR, chromatic dispersion, PMD, and non-linear effects of the established optical path. The supervisory controllers 13a and 13f thus adjust a signal intensity, and compensation amounts for the chromatic dispersion, PMD, and non-linear effects. The supervisory controllers 13a and 13f thus optimize the established optical path.

Multiplexing and Demultiplexing of Supervisory Channels

Figure 3:
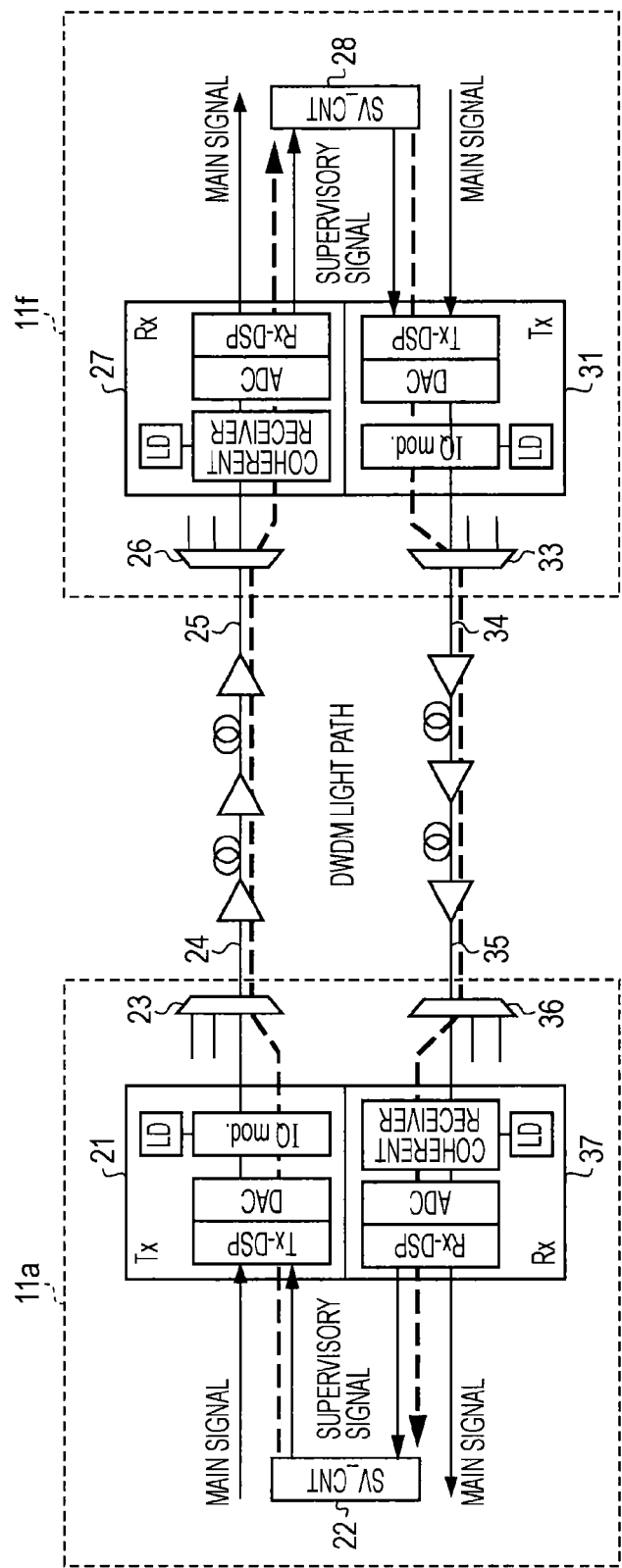
FIG. 3 illustrates multiplexing and demultiplexing of a supervisory channel in an optical node.

FIG. 3 illustrates multiplexing and demultiplexing of the supervisory channel in optical nodes. As illustrated in FIG. 3, a transmitter (Tx) 21 in the optical node 11a serving as a source node of the optical path is supplied with main signal data. The transmitter 21 is also supplied with supervisory signal data generated by the supervisory controller (SV_CNT) 22 in the optical node 11a. The supervisory controller 22 corresponds to the supervisory controller 13a in FIG. 2.

The transmitter 21 frequency-modulates the main signal data with the supervisory signal data, and IQ-modulates laser light with a signal resulting from superposing the supervisory signal on the main signal. An optical multiplexer 23 wavelength-multiplexes an optical signal output by the transmitter 21 and an optical signal from another transmitter, and then outputs a resulting signal as wavelength division multiplexer (WDM) signal to an optical transmission path 24 establishing the optical path.

The WDM signal transmitted through an optical transmission path 25 establishing the optical path is supplied to the optical node 11f as a terminal node of the optical path. An optical demultiplexer 26 in the optical node 11f demultiplexes the received WDM signal into an optical signal on a per wavelength basis. The optical signal thus demultiplexed is supplied to a receiver (Rx) 27. The receiver 27 coherently receives the demultiplexed optical signal. The receiver 27 frequency-demodulates the coherently received signal, thereby acquiring main signal data and supervisory signal data. The main signal data are supplied to a subsequent circuit, and the supervisory signal data are supplied to a supervisory controller 28. The supervisory controller 28 corresponds to the supervisory controller 13f in FIG. 2.

Similarly, a transmitter 31 in the optical node 11f is supplied with main signal data. Supervisory signal data generated by the supervisory controller 28 in the optical node 11f are supplied to the transmitter 31. The transmitter 31 frequency-modulates the main signal data with the supervisory signal data, and IQ-modulates laser light with the frequency-modulated main signal data, and then outputs the modulated laser light. An optical multiplexer 33 multiplexes the optical signal output by the transmitter 31 and an optical signal from another transmitter, and then outputs a resulting signal as a WDM signal to an optical transmission path 34 establishing the optical path.

The WDM signal transmitted through an optical transmission path 35 establishing the optical path is supplied to the optical node 11a. An optical demultiplexer 36 in the optical node 11a demultiplexes the received WDM signal into an optical signal of each wavelength. The optical signal thus demultiplexed is supplied to a receiver 37. The receiver 37 coherently receives the optical signal. The receiver 37 frequency-demodulates the coherently received optical signal, thereby acquiring main signal data and supervisory signal data. The main signal data are supplied to a subsequent circuit, and the supervisory signal data are supplied to the supervisory controller 22.

The supervisory controller 22 in the optical node 11a and the supervisory controller 28 in the optical node 11f transmit and receive the supervisory signal data. The supervisory controller 22 and the supervisory controller 28 thus exchange the supervisory signal data containing OSNR, chromatic dispersion, PMD, and non-linear effects of the established optical path. The supervisory controller 22 and the supervisory controller 28 adjust a signal intensity, and compensation amounts of chromatic dispersion, PMD, and non-linear effects. The established optical path is thus optimized.

Structure of Transmitter and Receiver

Figure 4:
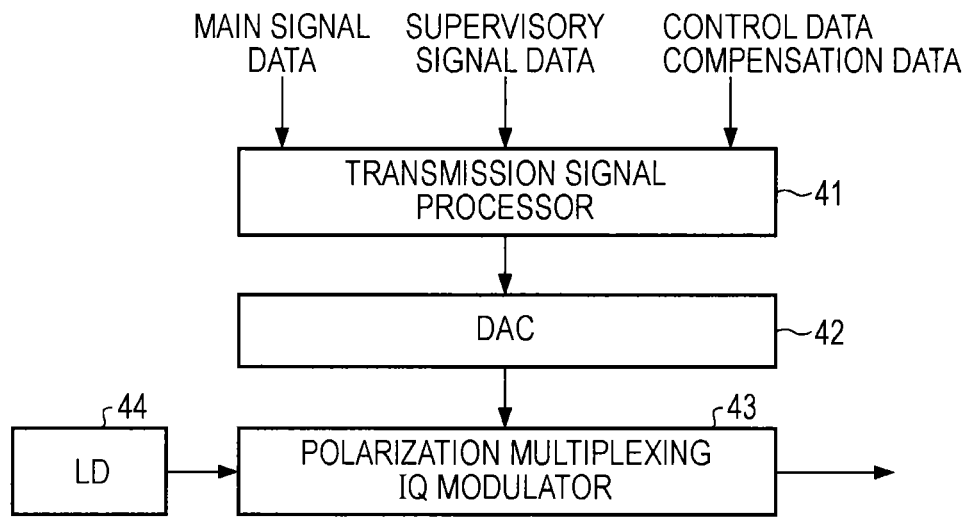
FIG. 4 is a block diagram illustrating a transmitter of an embodiment.
Figure 5:
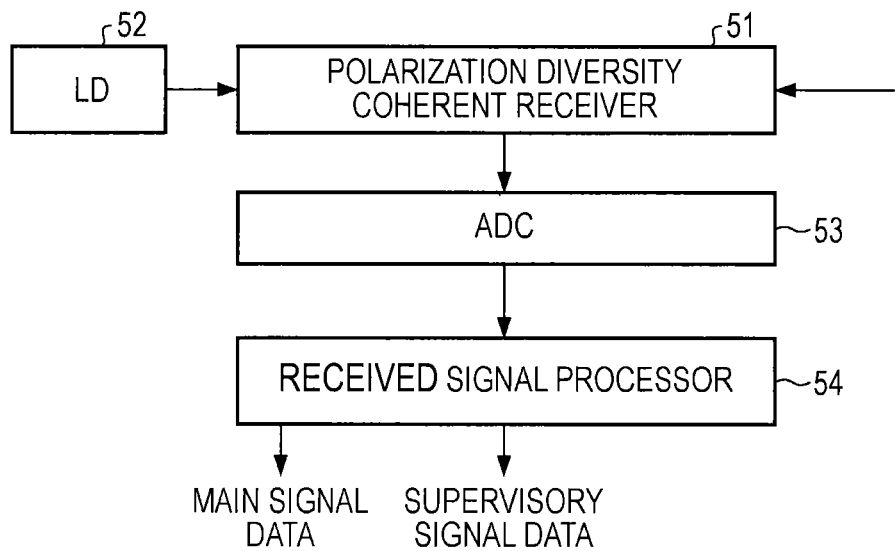
FIG. 5 is a block diagram illustrating a receiver of an embodiment.

FIGS. 4 and 5 respectively illustrate a transmitter and a receiver of an embodiment. The transmitter of FIG. 4 corresponds to the transmitters 21 and 31 of FIG. 3. The receiver of FIG. 5 corresponds to the receivers 27 and 37 of FIG. 3.

As illustrated in FIG. 4, a transmission signal processor 41 may be at least one of digital signal processor (DSP), a field-programmable gate array (FPGA), and an application specific integrated circuit (ASIC). The transmission signal processor 41 receives main signal data. The transmission signal processor 41 also receives supervisory signal data from the supervisory controller, and control data and compensation data from an upper-level device or the supervisory controller. The transmission signal processor 41 separates, from the main signal data, two signals corresponding to polarization components X and Y orthogonal to each other. The transmission signal processor 41 constellation-maps the main signal data of two signals to electric field information in accordance with the modulation format such as QPSK, QAM, or OFDM indicated by the control data. The transmission signal processor 41 compensates for signal quality degradations of a transmission line in electric field phase indicated by the electric field information mapped to the main signal data. The transmission signal processor 41 performs fine adjustment on a carrier frequency of the optical signal by imparting a phase rotation to the electric field phase with a certain period. In this case, digital frequency modulation with the supervisory signal data is performed by imparting the phase rotation responsive to the supervisory signal data. The frequency modulation with the supervisory signal data may be performed on the electric field information of one of the polarization component X and the polarization component Y or on the electric field information of both the polarization component X and the polarization component Y. The transmission signal processor 41 compensates for signal quality degradations caused by imperfections of a transmission system including loss variation, skews, bandwidth variations, linearity between I and Q signals, in each of an in-phase (I) component and quadrature phase (Q) component of the electric field information of the polarization component X and the polarization component Y. The transmission signal processor 41 thus outputs the compensated polarization component X and polarization component Y.

The electric field information of the polarization component X and the electric field information of the polarization component Y output by the transmission signal processor 41 are supplied to a digital-to-analog converter (DAC) 42. The DAC 42 digital-to-analog converts the electric field information and supplies resulting analog polarization component X and polarization component Y to a polarization multiplexing IQ modulator 43. The polarization multiplexing IQ modulator 43 is a polarization multiplexing modulator that separately performs optical modulation on the mutually orthogonal polarization components X and Y. The polarization multiplexing IQ modulator 43 modulates output light of a laser light source (LD) 44 with the I component and the Q component of the polarization components X and Y, and the outputs a modulated signal as an optical signal through a transmission path.

As illustrated in FIG. 5, a received optical signal is supplied to a polarization diversity coherent receiver 51. A laser light source (LD) 52 supplies the polarization diversity coherent receiver 51 with local oscillator light. The polarization diversity coherent receiver 51 separates a polarization component X and a polarization component Y from the received optical signal. An optical phase hybrid unit causes the polarization component X and the local oscillator light to interfere with each other in phase and reverse phase, resulting in a pair of output light rays. The optical phase hybrid unit causes the polarization component X and the local oscillator light to interfere with each other orthogonally (with +90 degrees) and inverse orthogonally (with −90 degrees), resulting in a pair of output light rays. A balanced photodiode differentially receives interfering light rays in phase and reverse phase, and obtains electrical signals of an in-phase interference component (I) and an orthogonal interfering component (Q) between the polarization component X and the local oscillator light. Similarly, the balanced photodiode obtains electrical signals of an in-phase interference component (I) and an orthogonal interfering component (Q) of the polarization component Y.

The I and Q components of the polarization components X and Y are supplied to an analog-to-digital converter (ADC) 53. The ADC 53 analog-to-digital converts the I and Q components and supplies digital I and Q components to a received signal processor 54. The received signal processor 54 is a DSP, for example. The received signal processor 54 frequency-demodulates a digital value of each of the I and Q components of each polarization component, thereby resulting in supervisory signal data. The received signal processor 54 also performs a chromatic dispersion compensation process on the digital values of the I and Q components of each polarization component, adaptive equalization process, frequency offset removal process, and determination process on the main signal data. The received signal processor 54 thus outputs the main signal data and the supervisory signal data.

Digital Frequency Modulation

Figure 6:
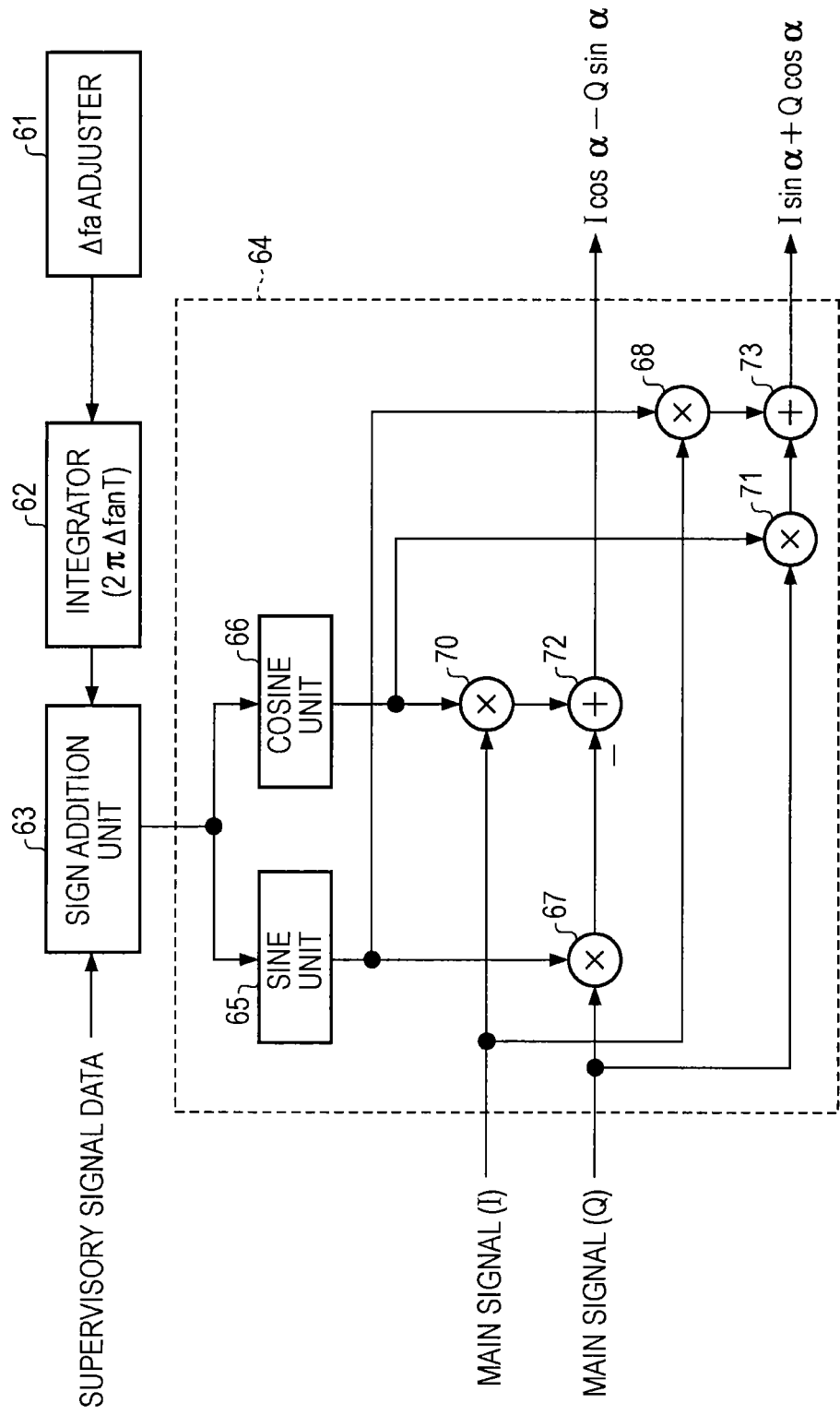
FIG. 6 is a block diagram illustrating a digital frequency modulator of an embodiment.

FIG. 6 illustrates an example of a digital frequency modulator of one embodiment in the transmission signal processor 41. The digital frequency modulator handles the polarization component X (or the polarization component Y).

In FIG. 6, a $\Delta fa$ adjuster 61 generates and supplies a frequency control amount $\Delta fa$ to an integrator 62. The $\Delta fa$ adjuster 61 adjusts the frequency control amount $\Delta fa$ to a large value during initial setting prior to synchronization establishment of a main signal. The $\Delta fa$ adjuster 61 then adjusts the frequency control amount $\Delta fa$ to a smaller value during an operation subsequent to the synchronization establishment of the main signal. The frequency control amount $\Delta fa$ is sufficient large in comparison with a difference between a frequency of the laser light source of the transmitter and a frequency of the laser light source of the receiver.

The integrator 62 integrates a phase rotation amount $\Delta\omega$ ($=2\pi\Delta fa$) every discrete time unit T, resulting in a phase rotation amount $\Delta\omega nT$ throughout discrete time nT. The integrator 62 then outputs the phase rotation amount $\Delta\omega nT$ to a sign addition unit 63.

The sign addition unit 63 attaches to the phase rotation amount $\Delta\omega nT$ output by the integrator 62 a sign responsive to the supervisory signal data. If the supervisory signal data are a value 1, the sign addition unit 63 outputs the phase rotation amount $+\Delta\omega nT$. If the supervisory signal data are a value 0, the sign addition unit 63 outputs the phase rotation amount $-\Delta\omega nT$. An output of the sign addition unit 63 is supplied to a sine unit 65 and a cosine unit 66, forming a phase rotation unit 64.

The sine unit 65 in the phase rotation unit 64 calculates and outputs a sine function of the supplied phase rotation amount, and the cosine unit 66 in the phase rotation unit 64 calculates and output a cosine function of the supplied phase rotation amount. A multiplier 67 multiplies an output of the sine unit 65 by the Q component of the main signal, and a multiplier 68 multiplies the output of the sine unit 65 by the I component of the main signal. The multiplier 70 multiplies an output of the cosine unit 66 by the I component of the main signal, and the multiplier 71 multiplies the output of the cosine unit 66 by the Q component of the main signal. A subtracter 72 subtracts an output of the multiplier 67 from an output of the multiplier 70 and outputs a resulting difference. An adder 73 adds an output of the multiplier 68 to an output of the multiplier 71, and then outputs a resulting sum. Let $\alpha$ represent the phase rotation amount, and an output of the subtracter 72 is $I\cos\alpha - Q\sin\alpha$. An output of the adder 73 is $I\sin\alpha + Q\cos\alpha$. The I component and the Q component of the main signal rotate by a phase rotation amount $\alpha$ ($=+\Delta\omega nT$ or $-\Delta\omega nT$) during the discrete time nT. More specifically, an optical signal output by the polarization multiplexing IQ modulator 43 is a frequency-modulated signal represented by $f_T \pm \Delta fa$ where $f_T$ represents a center frequency, and nT represent unit time.

Structure of Receiver

Figure 7:
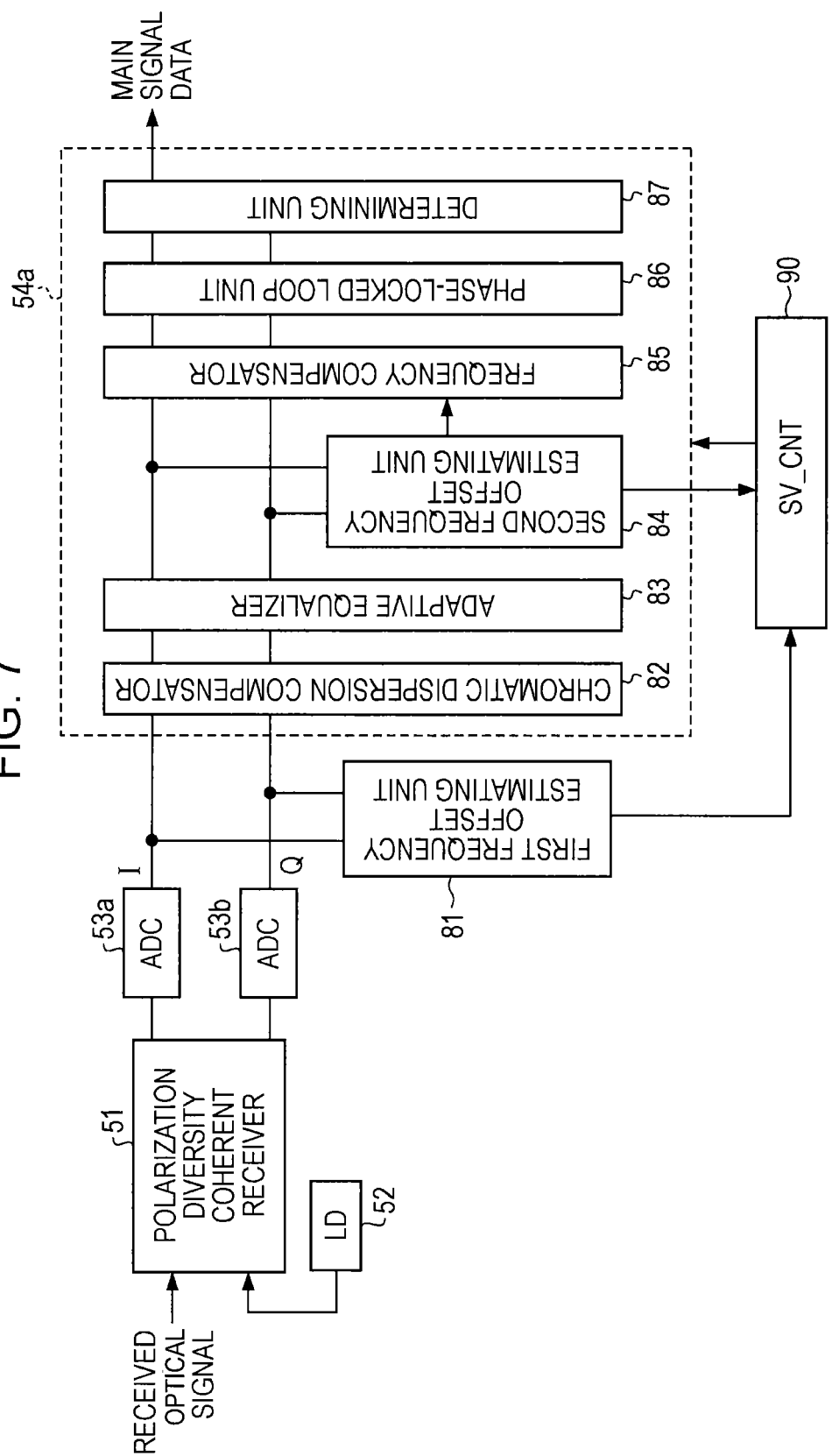
FIG. 7 is a block diagram illustrating in detail the receiver of the embodiment.

FIG. 7 illustrates the polarization diversity coherent receiver 51 of FIG. 5 in detail as one embodiment. FIG. 7 illustrates only the polarization diversity coherent receiver 51 and subsequent elements thereof that processes the polarization component X (or the polarization component Y), and elements identical to those illustrated in FIG. 5 are designated with the same reference numerals.

As illustrated in FIG. 7, a received optical signal is supplied to the polarization diversity coherent receiver 51. The polarization diversity coherent receiver 51 is supplied with local oscillator light from a laser light source 52. The polarization diversity coherent receiver 51 separates a polarization component X and a polarization component Y from the received optical signal. An optical phase hybrid unit causes the polarization component X and the local oscillator light to interfere with each other in phase and reverse phase, resulting in a pair of output light rays. The optical phase hybrid unit causes the polarization component X and the local oscillator light to interfere with each other orthogonally (with +90 degrees) and inverse orthogonally (with −90 degrees), resulting in a pair of output light rays. A balanced photodiode differentially receives interfering light rays in phase and reverse phase, and obtains electrical signals of an in-phase interference component (I) and an orthogonal interfering component (Q) between the polarization component X and the local oscillator light.

The I and Q components of the polarization component X output by the polarization diversity coherent receiver 51 are respectively analog-to-digital converted through AD converters (ADC) 53a and 53b to digital I and Q components. The digital I and Q components are then supplied to a received signal processor 54a, and to a first frequency offset estimating unit 81. The first frequency offset estimating unit 81 estimates a frequency offset amount caused by a frequency difference between the laser light sources of the transmitter and the receiver in an initial setting before the main signals are synchronized. In accordance with the estimated offset amount, the first frequency offset estimating unit 81 demodulates the supervisory signal data superimposed in digital frequency modulation by the transmitter, and then supplies demodulated supervisory signal data to a supervisory controller (SV_CNT) 90.

A chromatic dispersion compensator 82 in the received signal processor 54a compensates for chromatic dispersion in the supplied I and Q components. An adaptive equalizer 83 performs an equalization process on I and Q components output by the chromatic dispersion compensator 82, i.e., compensates for a mixture of X polarization and Y polarization. Equalized I and Q components are then supplied to a second frequency offset estimating unit 84 and a frequency compensator 85.

The second frequency offset estimating unit 84 estimates a frequency offset amount caused by a frequency difference between the laser light sources of the transmitter and the receiver during an operation after the main signals are synchronized. In accordance with the estimated offset amount, the second frequency offset estimating unit 84 demodulates the supervisory signal data superimposed in digital frequency modulation by the transmitter, and then supplies demodulated supervisory signal data to the supervisory controller 90.

The frequency compensator 85 compensates for the frequency offset amount estimated by the second frequency offset estimating unit 84 in accordance with the I and Q components output by the adaptive equalizer 83. A phase-locked loop unit 86 synchronizes I and Q components output by the frequency compensator 85 with a phase of the light output by the laser light source in the transmitter. A determining unit 87 determines a value of each of I and Q components output by the phase-locked loop unit 86 in accordance with each of the modulation formats, demodulates the main signal data and outputs demodulated main signal data.

The supervisory controller 90 corresponds to each of the supervisory controllers 22 and 28 in FIG. 3. The supervisory controller 90 retrieves from the first frequency offset estimating unit 81 the supervisory signal data indicating the modulation format of the main signal, for example, and then notifies the determining unit 87 in the received signal processor 54a of the supervisory signal data. The supervisory controller 90 also retrieves, from the second frequency offset estimating unit 84, the supervisory signal data that compensate for OSNR, chromatic dispersion, PMD, non-linear effects, and the like. The supervisory controller 90 then controls the chromatic dispersion compensator 82, the adaptive equalizer 83, the frequency compensator 85, the phase-locked loop unit 86, and the determining unit 87 in the received signal processor 54a.

Figure 8:
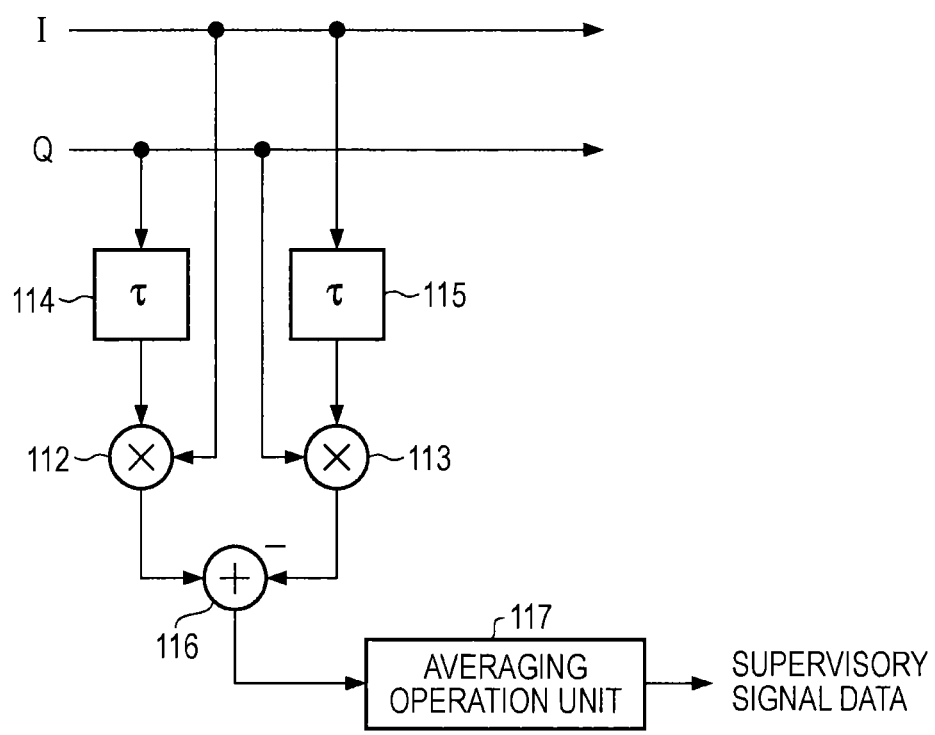
FIG. 8 is a circuit diagram of a first frequency offset estimating unit of a first embodiment.

FIG. 8 is a circuit diagram of the first frequency offset estimating unit 81 of a first embodiment. As illustrated in FIG. 8, a digital value of the I component output by the ADC 53a is supplied to a multiplier 112. Also, the digital value of the I component output by the ADC 53a is delayed by unit time t by a delay element 115 before being supplied to a multiplier 113. A digital value of the Q component output by the ADC 53b is supplied to the multiplier 113. The digital value of the Q component output by the ADC 53b is delayed by unit time τ by a delay element 114 before being supplied to the multiplier 112. The multiplier 112 multiplies the I component by the delayed Q component, and the multiplier 113 multiplies the Q component by the delayed I component. A subtracter 116 subtracts the output of the multiplier 112 from the output of the multiplier 113, thereby determining a difference therebetween. An average operation unit 117 calculates an average value of differences of n times, for example, output by the subtracter 116, and then outputs the resulting average value as a frequency offset. For example, n may be 100 or so.

The received optical signal supplied to the polarization diversity coherent receiver 51 may be represented by expression s(t)exp(jωt). Let s(t) represent a modulation baseband data signal, and ω represent a frequency of a carrier wave. The local oscillator light from the laser light source 52 is represented by expression exp(jωLt). In this case, the I and Q components are represented by I+jQ=s(t)exp(jδωt). Here, δω=ω−ωL holds, and symbols "< >" represent an operation of averaging, and symbol "*" represents complex conjugate. The first frequency offset estimating unit 81 is an autocorrelation calculation unit, and a signal output by the average operation unit 117 is represented by expression (1).

$$\langle -I(t)Q(t-\tau) + Q(t)I(t-\tau) \rangle = \quad (1)$$
$$\mathrm{Im}[\langle s(t)\exp(j\delta\omega t)s*(t-\tau)\exp(-j\delta\omega t)\exp(-j\delta\omega\tau)\rangle] =$$
$$\mathrm{Im}[\exp(j\delta\omega\tau)\langle s(t)s*(t-\tau)\rangle] = \sin(\delta\omega\tau)\langle s(t)s*(t-\tau)\rangle$$

Here, term <s(t)s*(t−τ)> represents an autocorrelation coefficient, and is a specific positive value. In expression (1), δωτ is in the vicinity of 0 (−π/2<δωτ<π/2). If δωτ is positive, sin(εωτ)<s(t)s*(t−τ)> is positive. If δωτ is negative, sin (δωτ) <s(t)s*(t−τ)> is negative.

Whether the received optical signal is offset from the center frequency $f_T$ into a positive side or a negative side is determined from the output of the first frequency offset estimating unit 81 represented by expression (1). The supervisory signal data are thus frequency demodulated from the received optical signal.

Figure 9A:
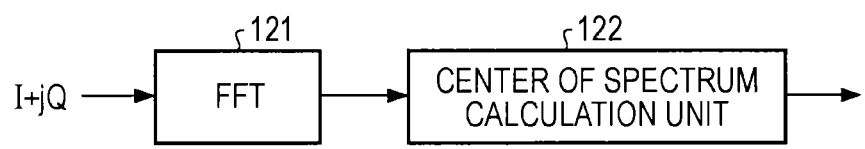
FIG. 9A is a circuit diagram of a first frequency offset estimating unit of a second embodiment.

FIG. 9A is a circuit diagram of the first frequency offset estimating unit 81 as a second embodiment. As illustrated in FIG. 9A, a fast Fourier transform (FFT) unit 121 receives a complex signal having as a real part thereof the I component output by the ADC 53a and as an imaginary part thereof the Q component output by the ADC 53b. The FFT unit 121 performs fast Fourier transform on the supplied signal, and then supplies the transformed signal to a center of spectrum calculation unit 122.

The center of spectrum calculation unit 122 calculates a spectrum of the spectrum from the FFT unit 121. The center of spectrum is a center frequency of a frequency range of the spectrum where signals are distributed. The center of spectrum calculation unit 122 calculates the center of spectrum in accordance with expression (2)

$$\text{Center of spectrum} = \frac{\sum_{i=-N/2-1}^{N/2} i \times P(i)}{\sum_{i=-N/2-1}^{N/2} P(i)} \times \Delta \times \frac{1}{fb} \quad (2)$$

Here, i represents an index indicating a frequency in the spectrum, P(i) represents power of the spectrum on the frequency indicated by the index, and N represents an FFT size of Fourier transform of the FFT unit 121. Furthermore, Δ is fs/(N−1), fs is a sampling frequency of the ADCs 53a and 53b, and fb is a baud rate of the signal light received by the polarization diversity coherent receiver 51.

Figure 9B:
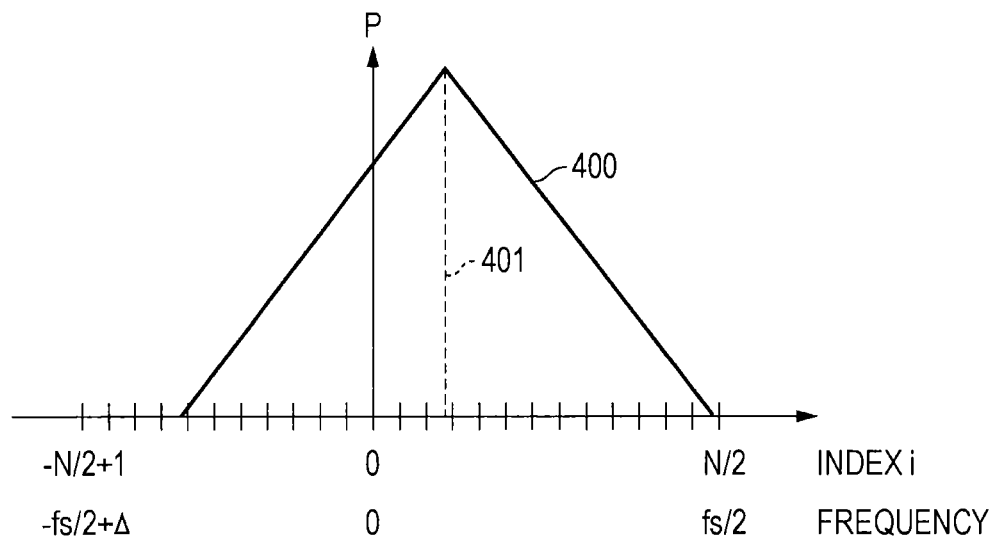
FIG. 9B illustrates an example of a spectrum of a signal.

FIG. 9B illustrates an example of the signal spectrum. In FIG. 9B, the abscissa represents frequency and index i responsive to the frequency. More specifically, −N/2+1 through N/2 of index i correspond to frequency −fs/2+Δ through fs/2. The ordinate represents power P at a frequency component. The spectrum denoted by a solid line 400 is the spectrum supplied by the FFT unit 121.

The center of spectrum denoted by a broken line 401 is calculated by the center of spectrum calculation unit 122. The center of spectrum 401 is shifted from the center frequency at 0 in response to a magnitude of the frequency offset.

Whether the received optical signal is offset from the center frequency $f_T$ into a positive side or a negative side is determined by estimating the frequency offset based on spectrum II. The supervisory signal data are thus frequency demodulated from the received optical signal.

Figure 10:
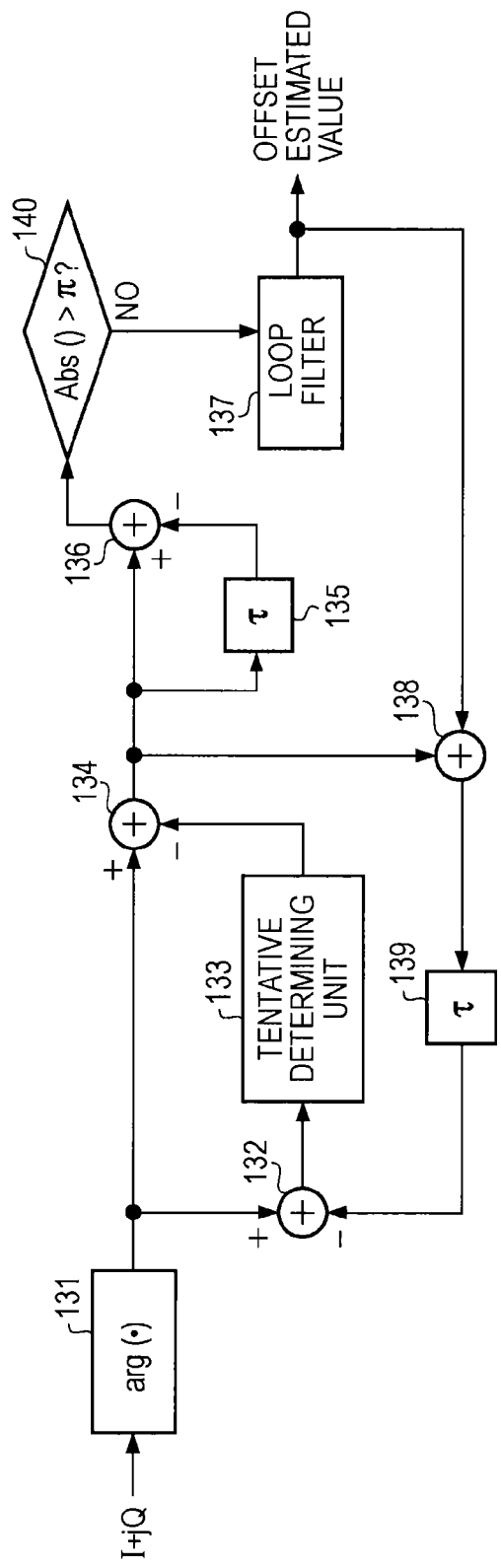
FIG. 10 is a circuit diagram of a second frequency offset estimating unit of an embodiment.

FIG. 10 is a circuit diagram of the second frequency offset estimating unit 84 as an embodiment. As illustrated in FIG. 10, the second frequency offset estimating unit 84 includes argument calculation unit 131, subtracter 132, tentative determining unit 133, subtracter 134, delay element 135, subtracter 136, loop filter 137, adder 138, delay element 139, and determining unit 140.

The second frequency offset estimating unit 84 recursively estimates the frequency offset of a signal input thereto. More specifically, the second frequency offset estimating unit 84 estimates the frequency offset by feeding back an output of the loop filter 137 as a calculation result of frequency offset.

A complex signal having as a real part the I component output by the adaptive equalizer 83 and as an imaginary part the Q component of the adaptive equalizer 83 is supplied to the argument calculation unit 131. The argument calculation unit 131 calculates a phase angle indicated by the complex signal input thereto. The argument calculation unit 131 supplies a signal indicating the calculated phase angle to the subtracter 132 and the subtracter 134. The subtracter 132 subtracts an output signal of the delay element 139 from the output signal of the argument calculation unit 131. The subtracter 132 supplies a subtraction result to the tentative determining unit 133.

The tentative determining unit 133 tentatively determines (identifies) the subtraction result from the subtracter 132. The tentative determining unit 133 supplies a signal indicating a tentative determination result to the subtracter 134. The subtracter 134 subtracts the output signal of the tentative determining unit 133 from the output signal of the argument calculation unit 131. The subtracter 134 supplies a subtraction result to the delay element 135, the subtracter 136, and the adder 138.

The delay element 135 delays the signal output by the subtracter 134 by unit time τ, i.e., one symbol, before supplying the signal output by the subtracter 134 to the subtracter 136. The subtracter 136 subtracts the output signal of the delay element 135 from the output signal of the subtracter 134. The subtracter 136 supplies a subtraction result to a determining unit 140. If an absolute value of a phase angle change during one symbol is equal to or lower than π, the determining unit 140 determines that the subtraction result is normal, and then supplies the subtraction result to the loop filter 137.

The loop filter 137 averages an output signal of the determining unit 140. The loop filter 137 is an infinite impulse response (IIR) filter having infinite response. The loop filter 137 outputs an averaged signal as the frequency offset value. The loop filter 137 also supplies the averaged signal to the adder 138.

The adder 138 sums the output signal of the subtracter 134 and the output signal of the loop filter 137. The adder 138 supplies a resulting sum to the delay element 139. The delay element 139 delays the output signal of the adder 138 by unit time τ. The delay element 139 supplies the delayed output signal to the subtracter 132.

A signal output by the argument calculation unit 131 at time t+1 is a phase angle θ(t+1). Phase angle θ(t+1) is represented by θd(t+1)+θfo(t+1)+θPN(t+1). Let θd(t+1) represent a modulation component, θfo(t+1) represent a phase rotation amount caused by the frequency offset, and θPN(t+1) represent phase noise.

The signal output by the tentative determining unit 133 indicates a tentative determination result of a modulation component, and is thus approximately equal to θd(t+1). The signal output by the subtracter 134 is represented by θfo(t+1)+θPN(t+1). The signal output by the delay element 135 is represented by θfo(t)+θPN(t).

The signal output by the subtracter 136 is represented by θfo(t+1)−θfo(t)+θPN(t+1)−θPN(t). If θPN(t+1)=θPN(t), the signal output by the subtracter 136 is represented by Δfo=θfo (t+1)−θfo(t). Δfo is an amount of change in the phase rotation amount between symbols, and thus indicates a frequency offset. The loop filter 137 acquires the frequency offset value by averaging the frequency offset Δfo. The loop filter 137 averages the frequency offset Δfo by as many as 10 times.

The signal output by the adder 138 is $\theta fo(t+1)+\theta PN(t+1)+\Delta fo$. The signal output by the delay element 139 is $\theta fo(t)+\theta PN(t)+\Delta fo$. Here, $\theta fo(t)=\theta fo(t+1)-\Delta fo$. Also, expression $\theta PN(t)=\theta PN(t+1)$ may hold. The signal output by the delay element 139 may be $\theta fo(t+1)+\theta PN(t+1)$, and the signal output by the subtracter 132 is a modulation component $\theta d(t+1)$.

Whether the received optical signal is offset from the center frequency $f_T$ into a positive side or a negative side is determined from the frequency offset value output by the loop filter 137. The supervisory signal data are thus frequency demodulated from the received optical signal.

Supervisory Channel

A supervisory signal is superimposed on a main signal by frequency-modulating main signal data with supervisory signal data in a supervisory channel. In the supervisory channel, a maximum frequency shift and communication speed during initial setting prior to establishment of synchronization of the main signals are different from those during operation subsequent to the establishment of the synchronization of the main signals. During the initial setting, the maximum frequency shift is set to be as large as the center frequency $f_T$ (several THz, for example) of the optical signal ± several 100 MHz. In other words, a frequency bandwidth is set to be wider. The communication speed is set to be low so that OSNR exceeds a specific value. With the maximum frequency shift set to be large and the communication speed set to be low, reliable demodulation may be performed even before the establishment of the synchronization of the main shifts. A maximum frequency shift affects the main signal, and is not used after the establishment of synchronization. Since a low communication speed reduces an amount of transmission, only limited information, such as the modulation format, is transmitted.

During the operation, the maximum frequency shift is set to be as small as the center frequency $f_T$ (several THz, for example) of the optical signal ± several 10 MHz. In other words, a frequency bandwidth is set to be narrower. The communication speed is set to be higher. If the modulation format of the main signal is known, demodulation may be performed even if the maximum frequency shift is small. With the maximum frequency shift set to be small, effects on the main signal are sufficiently small. With the communication speed set to be high, a high-speed communication is enabled. A large quantity of information including the supervisory signal data to compensate for OSNR, chromatic dispersion, PMD, and non-linear effects is transmitted.

Figure 11:
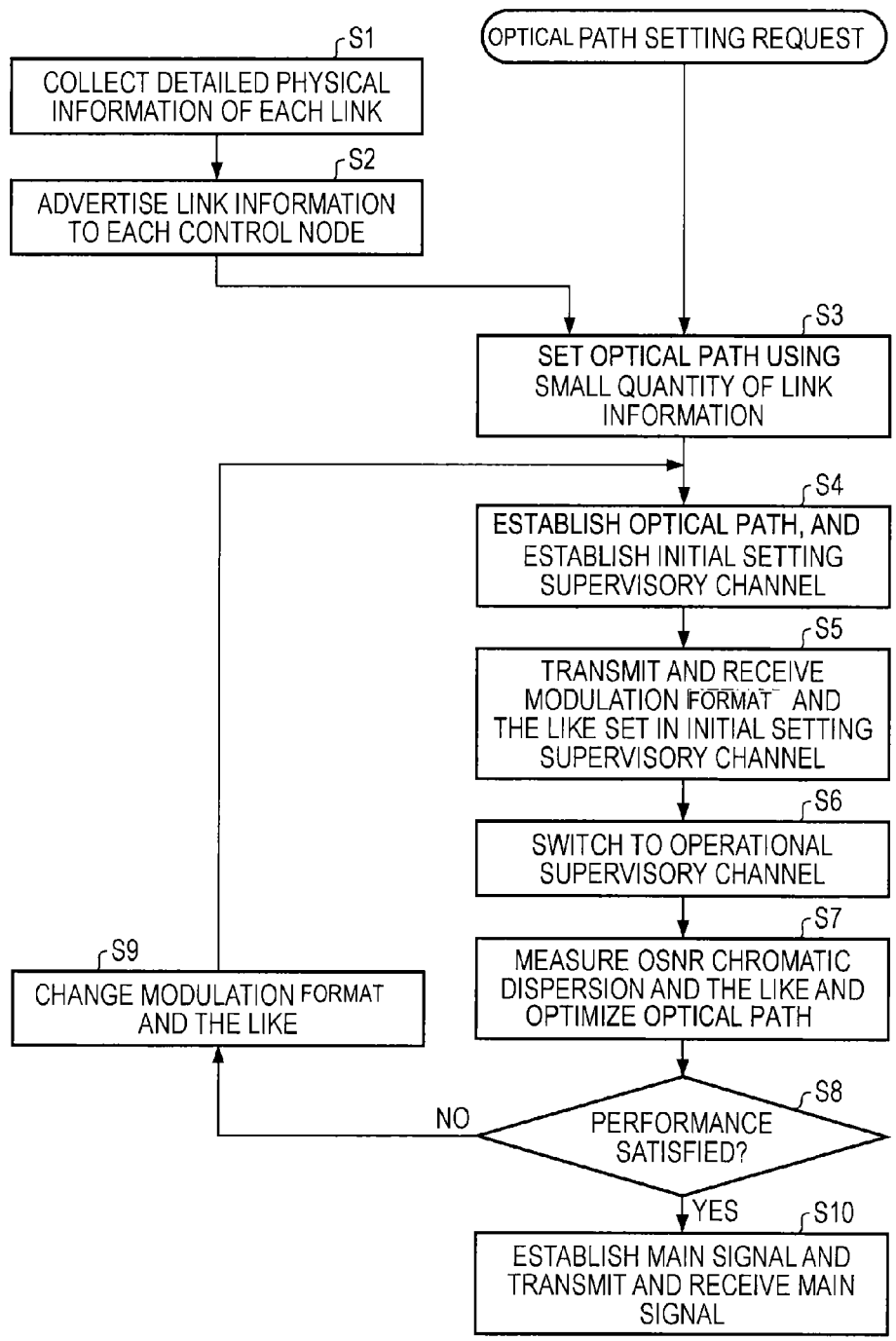
FIG. 11 is a flowchart illustrating an optical path establishing process of the first embodiment.

FIG. 11 is a flowchart illustrating an optical path establishing process. Each of a control node that is requested to establish an optical path and an optical node corresponding to the control node includes at least one processor and a memory corresponding to the processor. The processor performs the optical path establishing process.

In step S1 in FIG. 11, each source node in an optical network collects detailed physical information about at least one link connecting an optical node corresponding to the source node and an adjacent optical node. The detailed physical information may include unused wavelength, and OSNR, chromatic diversion, PMD, and non-linear effects such as Kerr effect of optical fiber for each of a plurality of modulation formats including QPSK, QAM, and OFDM. In step S2, each control node advertises the collected detail physical information of each link to the other control nodes in the optical network. Steps S1 and S2 are performed beforehand as a pre-process.

The optical path establishing process starts in response to an optical path setting request. When a control node receives the optical path setting request, the control node sets a route of the optical path from a source node to a terminal node of the optical path setting request, and wavelength to be used, a modulation format, baud rate, and FEC overhead rate in step S3. The control node that receives the optical path setting request is typically but not necessarily the source node. In step S3, a small quantity of information, such as the unused wavelength and OSNR, out of the detailed physical information of the link is used to set the route of the optical path, and wavelength to be used, a modulation format, baud rate, and FEC overhead rate.

In step S4, the control node of the source node having received the optical path setting request establishes an optical path on the control node of the terminal node using the route of the optical path, wavelength to be used, a modulation format, baud rate, and FEC overhead rate of the optical path. The control node as the source node sets a supervisory channel during the initial setting on the established optical path. In this state, a carrier wave of the main signal on which the supervisory signal is superimposed is present, but the main signal has no meaning.

In step S5, the set modulation format, baud rate, and FEC overhead rate are transmitted and received between the source node and the terminal node as optical nodes via the set initial setting supervisory channel.

In step S6, the supervisory channel is switched from an initial setting supervisory channel used during the initial setting to an operational supervisory channel used during operation. In step S7, OSNR, chromatic dispersion, PMD, and non-linear effect are measured by the source node and the terminal node as the optical nodes. Measurement results are mutually exchanged using the operational supervisory channel. The optical path is optimized by changing chromatic dispersion compensation amount, PMD compensation amount, and non-linear effect compensation amount in the optical nodes as the source node and the terminal node. Meaningful main signal may be transmitted or received via the optical path established in steps S6 and S7.

It is determined in step S8 whether OSNR, chromatic dispersion, PMD, and non-linear effect of the optimized optical path satisfy desired performance. The desired performance is that OSNR is equal to or above a preset threshold value, that residual chromatic dispersion is equal to or below a preset threshold value, that PMD is equal to or below a preset threshold value, and that non-linear distortion is equal to or below a preset threshold value.

If the desired performance is not satisfied, the modulation format, wavelength to be used, baud rate, and FEC overhead rate are modified in step S9. Processing then returns to step S4 to repeat steps S4 through S8. If the desired performance is satisfied, processing proceeds from steps S8 to S10.

In step S10, clock recovery, phase locked loop, and dispersion compensation are performed on the main signal to establish the main signal. The main signal is transmitted and received. OSNR, chromatic dispersion, PMD, and non-linear effect are measured periodically by the optical nodes as the source node and the terminal node. Measurement results are mutually exchanged over the operational supervisory channel. The optical path is optimized by changing the chromatic dispersion compensation amount, PMD compensation amount, and non-linear effect compensation amount in the optical nodes as the source node and the terminal node. The optical path is optimized in response to a dynamic change in OSNR, chromatic dispersion, PMD, and non-linear effect.

Figure 12:
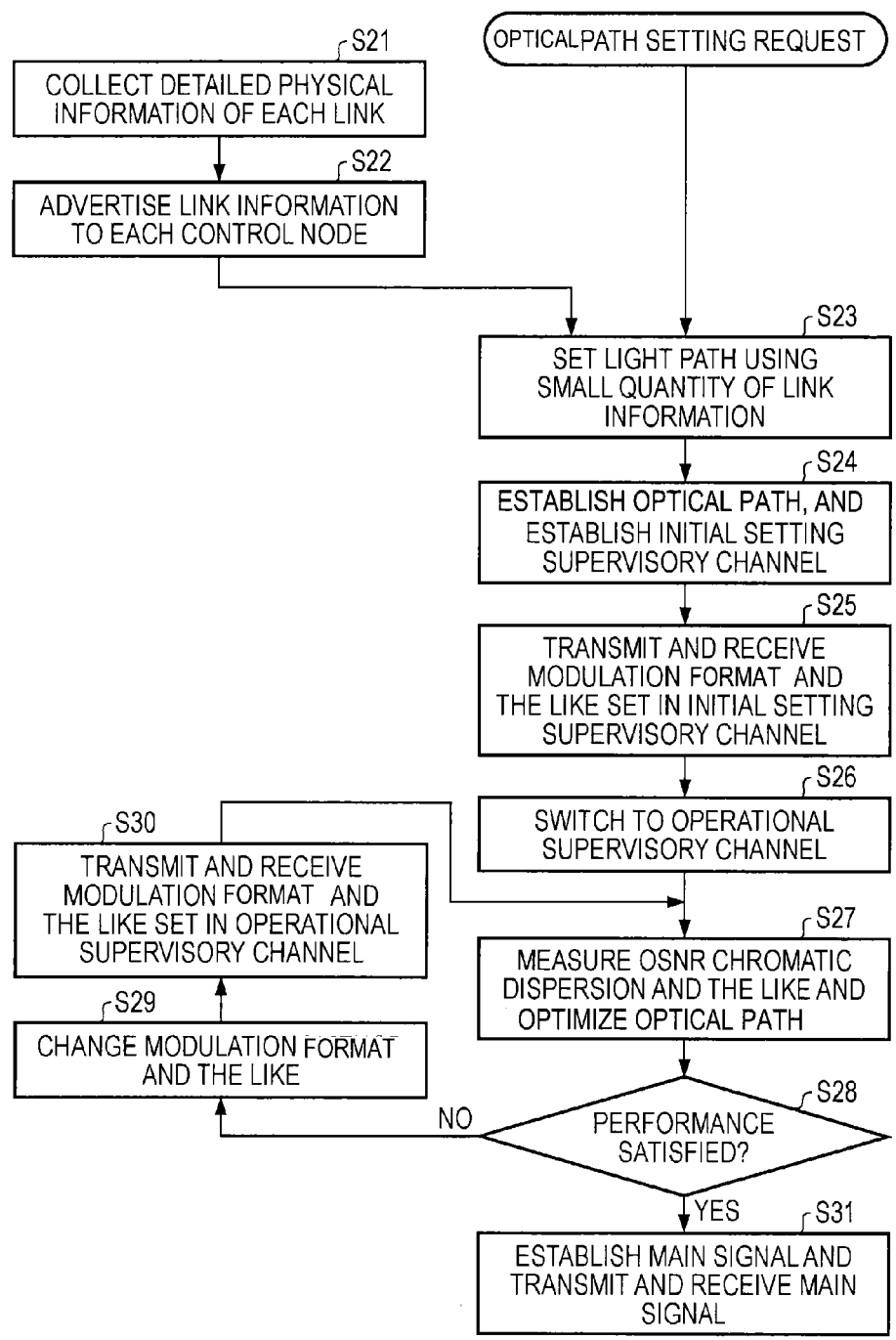
FIG. 12 is a flowchart illustrating an optical path establishing process of the second embodiment.

FIG. 12 is a flowchart illustrating an optical path establishing process of a second embodiment. Each of a control node that is requested to establish an optical path and an optical node corresponding to the control node includes at least one processor and a memory corresponding to the processor. The processor performs the optical path establishing process.

In step S21 in FIG. 12, each source node in an optical network collects detailed physical information about at least one link connecting an optical node corresponding to the source node and an adjacent optical node. The detailed physical information may include unused wavelength, and OSNR, chromatic diversion, PMD, and non-linear effects such as Kerr effect of optical fiber for each of a plurality of modulation formats including QPSK, QAM, and OFDM. In step S22, each control node advertises the collected detail physical information of each link to the other control nodes in the optical network. Steps S21 and S22 are performed beforehand as a pre-process.

The optical path establishing process starts in response to an optical path setting request. When a control node receives the optical path setting request, the control node sets a route of the optical path from a source node to a terminal node of the optical path setting request, and wavelength to be used, a modulation format, baud rate, and FEC overhead rate in step S23. The control node that receives the optical path setting request is typically but not necessarily the source node. In step S23, a small quantity of information, such as the unused wavelength and OSNR, out of the detailed physical information of the link is used to set the route of the optical path, and wavelength to be used, a modulation format, baud rate, and FEC overhead rate.

In step S24, the control node of the source node having received the optical path setting request establishes an optical path on the control node of the terminal node using the route of the optical path, wavelength to be used, a modulation format, baud rate, and FEC overhead rate of the optical path. The control node as the source node sets a supervisory channel during the initial setting on the established optical path. In this state, a carrier wave of the main signal on which the supervisory signal is superimposed is present, but the main signal has no meaning.

In step S25, the set modulation format, baud rate, and FEC overhead rate are transmitted and received between the source node and the terminal node as optical nodes via the set initial setting supervisory channel.

In step S26, the supervisory channel is switched from an initial setting supervisory channel used during the initial setting to an operational supervisory channel used during operation. In step S27, OSNR, chromatic dispersion, PMD, and non-linear effect are measured by the source node and the terminal node as the optical nodes. Measurement results are mutually exchanged using the operational supervisory channel. The optical path is optimized by changing the chromatic dispersion compensation amount, PMD compensation amount, and non-linear effect compensation amount in the optical nodes as the source node and the terminal node. Meaningful main signal may be transmitted or received via the optical path established in steps S26 and S27.

It is determined in step S28 whether OSNR, chromatic dispersion, PMD, and non-linear effect of the optimized optical path satisfy desired performance. The desired performance is that OSNR is equal to or above a preset threshold value, that residual chromatic dispersion is equal to or below a preset threshold value, that PMD is equal to or below a preset threshold value, and that non-linear distortion is equal to or below a preset threshold value.

If the desired performance is not satisfied, the modulation format, wavelength to be used, baud rate, and FEC overhead rate are modified in step S29. In step S30, the set modulation format, baud rate, and FEC overhead rate are transmitted and received between the optical nodes as the source node and the terminal node using the operational supervising channel. Processing proceeds to step S27. Steps in S27 and S28 are repeated. If the desired performance is satisfied, processing proceeds from steps S28 to S31.

In step S31, clock recovery, phase locked loop, and dispersion compensation are performed on the main signal to establish the main signal. The main signal is transmitted and received. OSNR, chromatic dispersion, PMD, and non-linear effect are measured periodically by the optical nodes as the source node and the terminal node. Measurement results are mutually exchanged over the operational supervisory channel. The optical path is optimized by changing the chromatic dispersion compensation amount, PMD compensation amount, and non-linear effect compensation amount in the optical nodes as the source node and the terminal node. The optical path is optimized in response to a dynamic change in OSNR, chromatic dispersion, PMD, and non-linear effect.

Timing Diagram

Figure 13:
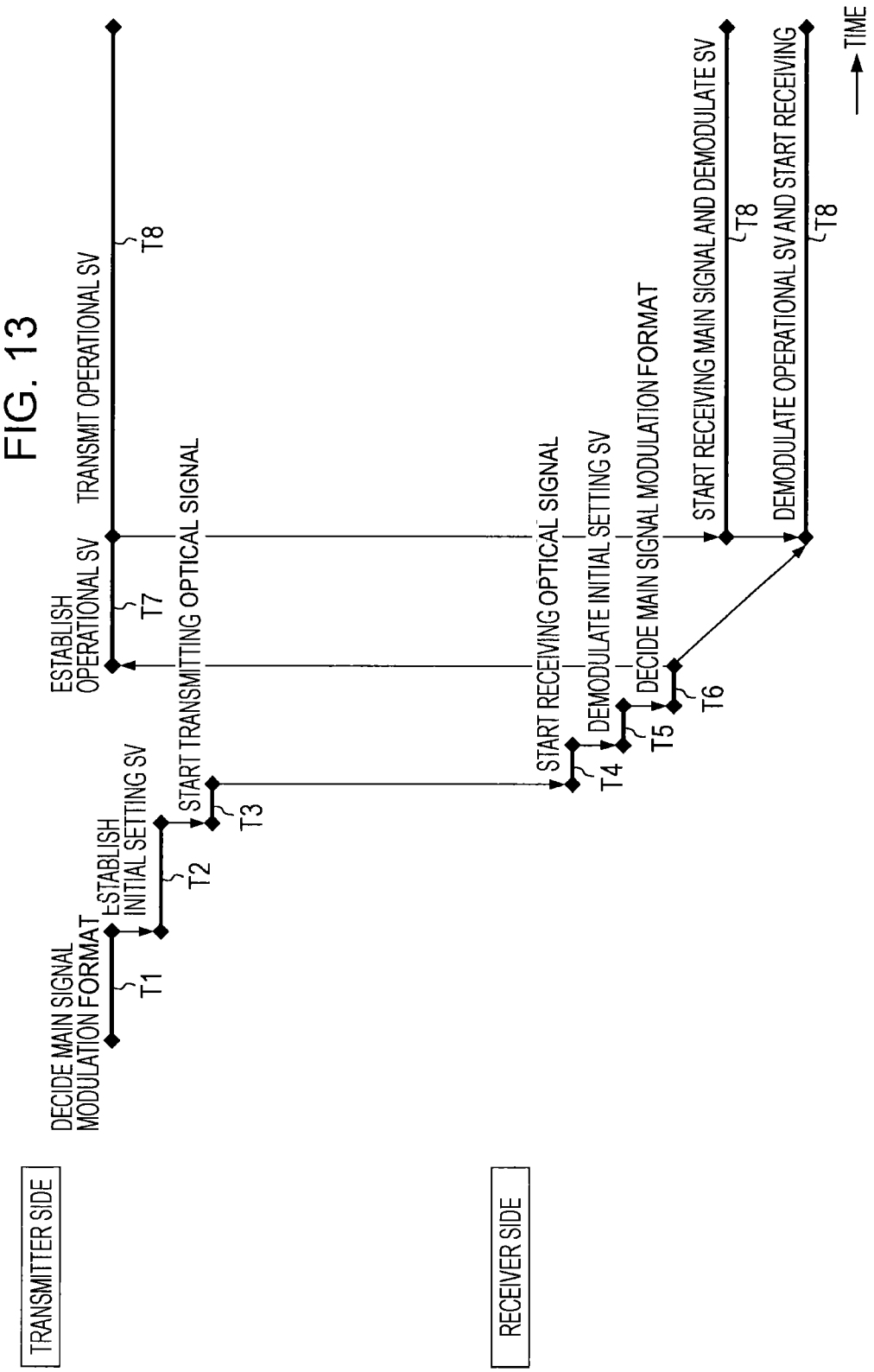
FIG. 13 is a timing diagram of the optical path establishing process.

FIG. 13 is a timing diagram of the optical path establishing process. During period T1, the transmitter, i.e., the control node serving as a source node sets a modulation format. The optical node of the source node establishes a supervisory channel (SV) in the initial setting during period T2, and starts transmitting an optical signal during period T3.

The receiver, i.e., the control node serving as a terminal node starts receiving the optical signal during period T4, and demodulates the supervisory channel (SV) in the initial setting during period T5. The optical node serving as the terminal node recognizes the modulation format of the main signal during period T6.

The optical node of the source node receives from the optical node of the terminal node a response that the modulation format of the main signal has been received, and establishes an operational supervisory channel (SV) during period T7 subsequent to period T6. The optical node of the source node transmits the main signal and the operational supervisory channel (SV) during period T8. The optical node of the terminal node receives the main signal during period T8 while also demodulating the operational supervisory channel (SV).

The main signal is frequency-modulated with the supervisory signal in accordance with the embodiments, different from related art where the main signal is intensity-modulated with the supervisory signal. The embodiments control cross-gain modulation caused through an optical amplifier and stimulated Raman scattering. With quality degradation reduced on the main signal, the supervisory data are exchanged between optical nodes. Without preknowledge of the detailed physical information of each link including OSNR, chromatic dispersion, polarization mode dispersion (PMD), and non-linear effects, the optical path is established and optimized by exchanging the supervisory signal superimposed on the main signal between the optical nodes. An optimum light waveform matching the optical path is set. Time to establish the optical path is shortened.

The channels of two types, the initial setting supervisory channel and the operational supervisory channel, are switchably used. A continuous operation is maintained during transition from supervisory signal exchange prior to the establishment of the main signals to supervisory signal exchange that does not affect the main signal in operation.

Since superposition of the supervisory signal to the main signal (frequency modulation) and extraction of the supervisory signal (frequency demodulation) are performed through digital signal processing, an addition of a new optical component becomes unnecessary. Large-size design of an optical node apparatus is thus controlled.

As described above, the supervisory signal is superimposed on the main signal through frequency modulation. If a modulation format is different from a modulation format of the main signal, the supervisory signal may be superimposed on the main signal through phase modulation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical path establishing method to establish an optical path between a first optical node and a second optical node in an optical network, the optical path establishing method comprising:

when a modulation format of an optical signal transmitted from the second optical node is not learned in the first optical node, determining an optical path and an optical signal by transmitting and receiving information between the first optical node and the second optical node via a supervisory signal that is superimposed on the optical signal by performing frequency modulation or phase modulation on the optical signal in a first frequency bandwidth or a first phase modulation bandwidth through a modulation format different from the modulation format of the optical signal; and optimizing transmission and reception characteristics of the optical path by transmitting and receiving information between the first optical node and the second optical node via a supervisory signal that is superimposed on the optical signal by performing frequency modulation or phase modulation on the optical signal in a second frequency bandwidth narrower than the first frequency bandwidth or a second phase modulation bandwidth narrower than the first phase modulation bandwidth through a modulation format different from the modulation format of the optical signal.

2. The optical path establishing method according claim 1, wherein the determining comprises, when the modulation format of the optical signal transmitted from the second optical node has not been learned in the first optical node, determining the optical path and the optical signal by transmitting and receiving the information between the first optical node and the second optical node via the supervisory signal that is superimposed on the optical signal by performing the frequency modulation or the phase modulation on the optical signal in the first frequency bandwidth as a bandwidth of the frequency modulation or in the first phase modulation bandwidth as a bandwidth of the phase modulation at a first communication speed as a communication speed of the supervisory signal; and wherein the optimizing comprises optimizing the transmission and reception characteristics of the optical path by transmitting and receiving the information between the first optical node and the second optical node via the supervisory signal that is superimposed on the optical signal by performing frequency modulation or phase modulation on the optical signal in the second frequency bandwidth as a bandwidth of the frequency modulation or the second phase modulation bandwidth as a bandwidth of the phase modulation at a second communication speed, as a communication speed of the supervisory signal, different from the first communication speed.

3. The optical path establishing method according to claim 2, wherein an effect of one of the second frequency bandwidth and the second phase modulation bandwidth on a main signal is negligibly small.

4. An optical node apparatus that establishes an optical path between a first optical node and a second optical node in an optical network, the optical node apparatus comprising:

a frequency modulation unit that superimposes a supervisory signal on a main signal by frequency-modulating the main signal; and a frequency demodulation unit that frequency-demodulates the supervisory signal superimposed on the received main signal, wherein the frequency modulation unit, when a modulation format of an optical signal that is transmitted and then received is not learned, sets a bandwidth of frequency modulation or a bandwidth of phase modulation to be a first frequency bandwidth or a first phase modulation bandwidth, and sets a communication speed of the supervisory signal to be a first communication speed, and wherein the frequency modulation unit, after the modulation format of the optical signal is learned, sets the bandwidth of the frequency modulation or the bandwidth of the phase modulation to be a second frequency bandwidth or a second phase modulation bandwidth, and sets the communication speed of the supervisory signal to be a second communication speed different from the first communication speed.

5. The optical node apparatus according to claim 4, wherein the frequency demodulation unit comprises an initial setting demodulation unit and an operational demodulation unit, wherein when the modulation format of the optical signal that is transmitted and then received is not learned, the initial setting demodulation unit performs frequency demodulation on the main signal that is frequency-modulated in the first frequency bandwidth as the bandwidth of frequency modulation or the first phase modulation bandwidth as the bandwidth of phase modulation, and at the first communication speed as the communication speed of the supervisory signal, and wherein after the modulation format of the optical signal is learned, the operational demodulation unit performs frequency demodulation on the main signal that is modulated in the second frequency bandwidth as the bandwidth of the frequency modulation or the second phase modulation bandwidth as the bandwidth of the phase modulation, and at the second communication speed, different from the first communication speed, as the communication speed of the supervisory signal.

6. The optical node apparatus according to one of claims 4, wherein an effect of one of the second frequency bandwidth and the second phase modulation bandwidth on the main signal is negligibly small.

* * * * *

UNITED STATES PATENT AND TRADEMARK OFFICE
CERTIFICATE OF CORRECTION

PATENT NO. : 8,989,572 B2  
APPLICATION NO. : 13/727902  
DATED : March 24, 2015  
INVENTOR(S) : Takahito Tanimura et al.

Page 1 of 1

It is certified that error appears in the above-identified patent and that said Letters Patent is hereby corrected as shown below:

In the Claims

Column 15, Line 45, In Claim 2, delete "according" and insert -- according to --, therefor.
Column 16, Line 59, In Claim 6, delete "one of claims" and insert -- claim --, therefor.

Signed and Sealed this
Twenty-first Day of July, 2015

Michelle K. Lee
*Director of the United States Patent and Trademark Office*